(12) United States Patent
Wilson

(10) Patent No.: US 7,824,654 B2
(45) Date of Patent: Nov. 2, 2010

(54) METHOD AND APPARATUS FOR GENERATING HYDROGEN

(76) Inventor: Mahlon S. Wilson, 85 Mesa Verde St., Los Alamos, NM (US) 87544-3438

( * ) Notice: Subject to any disclaimer, the term of this patent is extended or adjusted under 35 U.S.C. 154(b) by 481 days.

(21) Appl. No.: 11/561,664

(22) Filed: Nov. 20, 2006

(65) Prior Publication Data

US 2007/0116995 A1    May 24, 2007

Related U.S. Application Data

(60) Provisional application No. 60/739,495, filed on Nov. 23, 2005.

(51) Int. Cl.
  *C01B 3/22* (2006.01)
  *C01B 3/24* (2006.01)

(52) U.S. Cl. ............ 423/648.1; 423/650; 423/651; 423/652

(58) Field of Classification Search ............ 423/648.1, 423/650, 651, 652, 653, 654
See application file for complete search history.

(56) References Cited

U.S. PATENT DOCUMENTS

| | | | |
|---|---|---|---|
| 1,762,100 A * | 6/1930 | Odell | ............ 48/127.1 |
| 1,824,107 A | 9/1931 | Wyndham et al. | |
| 2,448,315 A | 8/1948 | Kunzog | |
| 3,289,756 A | 12/1966 | Jaeger et al. | |
| 3,321,333 A | 5/1967 | Palmer | |
| 3,323,586 A | 6/1967 | Burne et al. | |
| 3,333,318 A | 8/1967 | Jaeger | |
| 3,334,400 A | 8/1967 | Jaeger | |
| 3,339,260 A | 9/1967 | Burne et al. | |
| 3,433,299 A | 3/1969 | Fleming | |
| 3,450,199 A | 6/1969 | Warrell | |
| 3,880,232 A | 4/1975 | Parker | |
| 3,908,628 A | 9/1975 | Lazaridis et al. | |
| 4,004,634 A | 1/1977 | Habdas | |
| 4,407,238 A * | 10/1983 | Yoon | ............ 123/3 |
| 4,431,566 A | 2/1984 | Suzuki et al. | |
| 4,473,622 A | 9/1984 | Chludzinski et al. | |
| 4,631,266 A * | 12/1986 | Wold et al. | ............ 502/324 |
| 4,650,727 A | 3/1987 | Vanderborgh et al. | |
| 4,676,972 A * | 6/1987 | Velenyi et al. | ............ 423/418.2 |
| 5,317,805 A | 6/1994 | Hoopman et al. | |
| 5,527,588 A | 6/1996 | Camarda et al. | |
| 5,826,646 A | 10/1998 | Bae et al. | |
| 5,861,137 A | 1/1999 | Edlund | |
| 5,888,273 A | 3/1999 | Buxbaum | |
| 5,897,970 A | 4/1999 | Isomura et al. | |
| 5,938,800 A | 8/1999 | Verrill et al. | |
| 5,997,594 A | 12/1999 | Edlund et al. | |
| 6,152,995 A | 11/2000 | Edlund | |

(Continued)

OTHER PUBLICATIONS

"ElectraGen TM XTR Module brochure", http://www.idatech.com, (2002).

(Continued)

*Primary Examiner*—Wayne Langel
(74) *Attorney, Agent, or Firm*—Philip D. Askenazy; Peacock Myers, P.C.

(57) ABSTRACT

Method and apparatus for generating hydrogen from a fuel comprising an endothermically decomposable compound, preferably methanol, and optionally comprising water. A catalyst is preferably used to decompose the methanol into hydrogen and CO. The catalyst preferably has low selectivity for reacting the CO and water to form $CO_2$ and hydrogen. A permselective membrane, preferably cleaned by the water, is used to separate the hydrogen. The retentate has fuel value and is reacted or otherwise burned in order to provide heat for the decomposition reaction.

15 Claims, 3 Drawing Sheets

U.S. PATENT DOCUMENTS

| | | | |
|---|---|---|---|
| 6,221,117 B1 | 4/2001 | Edlund et al. | |
| 6,242,120 B1 | 6/2001 | Herron | |
| 6,244,333 B1 | 6/2001 | Bergh et al. | |
| 6,319,306 B1 | 11/2001 | Edlund et al. | |
| 6,348,278 B1* | 2/2002 | LaPierre et al. | 429/17 |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,419,728 B1 | 7/2002 | Edlund | |
| 6,451,464 B1 | 9/2002 | Edlund et al. | |
| 6,458,189 B1 | 10/2002 | Edlund et al. | |
| 6,465,118 B1 | 10/2002 | Dickman et al. | |
| D467,191 S | 12/2002 | Hill et al. | |
| 6,494,937 B1 | 12/2002 | Edlund et al. | |
| 6,537,352 B2 | 3/2003 | Edlund et al. | |
| 6,541,142 B1 | 4/2003 | Yu et al. | |
| 6,547,858 B1 | 4/2003 | Edlund et al. | |
| 6,562,111 B2 | 5/2003 | Edlund et al. | |
| 6,569,227 B2 | 5/2003 | Edlund et al. | |
| 6,596,057 B2 | 7/2003 | Edlund et al. | |
| 6,632,270 B2 | 10/2003 | Edlund et al. | |
| 6,649,562 B2 | 11/2003 | Naka et al. | |
| 6,667,128 B2 | 12/2003 | Edlund | |
| 6,719,831 B2 | 4/2004 | Edlund et al. | |
| 6,719,832 B2 | 4/2004 | Edlund et al. | |
| 6,723,156 B2 | 4/2004 | Edlund et al. | |
| 6,767,389 B2 | 7/2004 | Edlund et al. | |
| 6,783,741 B2 | 8/2004 | Edlund et al. | |
| 6,811,908 B2 | 11/2004 | Edlund et al. | |
| 6,818,335 B2 | 11/2004 | Edlund et al. | |
| 6,824,593 B2 | 11/2004 | Edlund et al. | |
| 6,835,481 B2 | 12/2004 | Dickman et al. | |
| 6,858,341 B2 | 2/2005 | Edlund et al. | |
| 6,869,707 B2 | 3/2005 | Edlund et al. | |
| 6,878,474 B2 | 4/2005 | Dickman et al. | |
| 6,887,605 B2 | 5/2005 | Herron | |
| 6,890,672 B2 | 5/2005 | Dickman et al. | |
| 6,953,497 B2 | 10/2005 | Edlund et al. | |
| 6,979,507 B2 | 12/2005 | Edlund et al. | |
| 6,994,927 B2 | 2/2006 | Edlund et al. | |
| 7,005,113 B2 | 2/2006 | Edlund et al. | |
| 2002/0011330 A1 | 1/2002 | Insley et al. | |
| 2002/0104645 A1 | 8/2002 | Yoshida et al. | |
| 2002/0136686 A1* | 9/2002 | Takahashi | 423/651 |
| 2002/0148221 A1 | 10/2002 | Jagtoyen et al. | |

OTHER PUBLICATIONS

"FPM TM Family of Fuel Processor Modules brochure", http://www.idatech.com, (2002).

"UltraCell XX25 TM Brochure", http://www.ultracelpower.com, (Feb. 2006).

Amandusson, H. , et al., "Alcohol dehydrogenation over Pd versus PdAg membranes", *Applied Catalysis A: General*, vol. 217, Elsevier Science B.V.,(2001),157-164.

Brown, J. C., et al., "Hydrogen production from methanol decomposition over Pt/Al2O3 and ceria promoted Pt/Al2O3 catalysts", *Catalysis Communications*, vol. 5, Elsevier, B.V.,(2004),431-436.

Buxbaum, Robert , "Membrane Reactors, Fundamental and Commercial Advantages, e.g. for Methanol Reforming", *Paper presented at the 15th BCC Membrane Planning Conference*, Newton, Massachusetts, Oct. 27-29, 1997, and at the *Canadian AICHE Membrane Separations Meeting*, Calgary, Alberta, Aug. 1997, (1997),1-7.

Fan, Yong , et al., "Development of Large-entrainment-ratio Micro Ejector for Catalytic Combustor", *Power MEMS 2005*, Tokyo, Japan, (Nov. 28-30, 2005),132-135.

Fateev, V. , et al., "Facilities and Restrictions in the Technology of on Board Hydrogen Production and Purification for Zero Emission Vehicles", Paper No. 01ATT035, (Nov. 13, 2001).

Hara, S. , et al., "Decline in Hydrogen Permeation Due to Concentration Polarization and CO Hindrance in a Palladium Membrane Reactor", *Ind. Eng. Chem. Res.*, vol. 38, American Chemical Society,(1999),4913-4918.

Hara, S. , et al., "Kinetics and Hydrogen Removal Effect for Methanol Decomposition", *Ind. Eng. Chem. Res.*, vol. 38, American Chemical Society,(1999),488-492.

Harold, Michael P., et al., "Hydrogen generation in a Pd membrane fuel processor: assessment of methanol-based reaction systems", *Checmial Engineering Science*, vol. 58, Elsevier Science Ltd.,(2003),2551-2571.

Holladay, Jamie , et al., "Fuel Processor Development for Small Power Supplies", *Small Fuel Cells for Portable Applications 2002*, Washington, D.C., (Apr. 21-23, 2002).

Holladay, Jamie , et al., "Micro-fuel Processors for a 15-25 Watt Fuel Cell Battery Hybrid Power Supply", *IECEC* Paper No. 20074, (2002).

Holladay, Jamie , et al., "Microscale Power Generation Using a Fuel Processor and Fuel Cell", *IECEC* Paper No. 20054, (2002).

Holladay, Jamelyn D., et al., "Review of Developments in Portable Hydrogen Production Using Microreactor Technology", *Chem. Rev.*, vol. 104, American Chemical Society,(2004),4767-4790.

Hou, K. , et al., "The effect of external mass transfer, competitive adsorption and coking on hydrogen permeation through thin Pd/Ag membranes", *Hournal of Membrane Science*, vol. 206, Elsevier Science B.V.,(2002),119-130.

Iwakura, Chiaki , et al., "A new hydrogenation system of 4-methylstyrene using a palladinized palladium sheet electrode", *Journal of Electronalytical Chemistry*, vol. 431, Elsevier Science S.A.,(1997),43-45.

Iwasa, Nobuhiro , et al., "Effect of Zn addition to supported Pd catalysts in the steam reforming of methanol", *Applied Catalysis A: General*, vol. 248, Elsevier B.V.,(2003),153-160.

Loffler, Daniel G., et al., "A light hydrocarbon fuel processor producing high-purity hydrogen", *Journal of Power Sources*, vol. 117, Elseiver Science B.V.,(2003),84-91.

Mae, Kazuhiro , et al., "Selective Decomposition of Methanol by a New Catalytic Microreactor", *Paper presented at Session 22: Novel Compact Reactors, Wyndham Franklin Plaza Conference Center Hall*, May 24, 2005, (2005).

Paglieri, S. N., et al., "Innovations in Palladium Membrane Research", *Seapration and Purification Methods*, vol. 31, No. 1, Marcel Dekker, Inc.,(2002),1-169.

Pattekar, Ashish V., et al., "A Microreactor for Hydrogen Production in Micro Fuel Cell Applications", *Hournal of Microelectromechanical Systems*, vol. 13, No. 1, IEEE,(Feb. 2004),7-18.

Powell, M. R., et al., "Compact Fuel Cell Power Supplies with Safe Fuel Storage", *Report distributed by Meso Systems Technology, Inc.,* Kennewick, Washington 99336, and *Intelligent Energy, Inc.*, Albuquerque, New Mexico 87107; also presented at the *Processing for the Army Science Conference* (24th), Nov. 29-Dec. 2, 2005, Orlando, Florida, (Dec. 2004),1-8.

Prigent, M. , "On Board Hydrogen Generation for Fuel Cell Powered Electric Cars: A Review of Various Available Techniques", *Revue de l'Institut Francais du Petrole*, vol. 52, No. 3, Institut francais du petrole,(May-Jun. 1997),349-360.

Satoh, Daisuke , et al., "Micro-ejectros to supply fuel-air mixture to a micro-combustor", *Sensors and Actuators A*, vol. 119, Elsevier, B.V.,(2005),528-536.

Shen, Wen-Jie , et al., "The influence of the support on the activity and selectivity of Pd in CO hydrogenation", *Applied Catalysis A: General*, vol. 213, Elsevier Science B.V.,(2001),225-232.

Tanaka, Shuji , et al., "MEMS-based components of a miniature fuel cell/fuel reformer system", *Chemical Engineering Journal*, vol. 101, Elsevier B.V.,(2004),143-149.

Usami, Yoshikazu , et al., "Catalytic methanol decomposition at low temperaturese over palladium supported on metal oxides", *Applied Catalysis A: General*, vol. 171, Elsevier Science B.V.,(1998),123-130.

Yu, Ya , et al., "Catalytic properties of alkali-leached Ni3Al for hydrogen production from methanol", *Intermetallics*, vol. 13, Elsevier Ltd.,(2005),151-155.

* cited by examiner

METHOD AND APPARATUS FOR GENERATING HYDROGEN

CROSS-REFERENCE TO RELATED APPLICATIONS

This application claims the benefit of the filing of U.S. Provisional Patent Application Ser. No. 60/739,495, entitled "Methanol Decomposition Hydrogen Generator", filed on Nov. 23, 2005, and the specification thereof is incorporated herein by reference.

BACKGROUND OF THE INVENTION

1. Field of the Invention (Technical Field)

The present invention relates to a hydrogen generating apparatus, method, and system. The present invention preferably decomposes an endothermically decomposable compound. The present invention preferably uses a hydrogen permselective separator to separate methanol decomposition products into permeate (hydrogen) and retentate (primarily CO). The retentate is then fed to a heater that burns the retentate using oxygen, preferably from air, to provide heat to the reactor and/or permselective separator.

2. Description of Related Art

Note that the following discussion refers to a number of publications and references. Discussion of such publications herein is given for more complete background of the scientific principles and is not to be construed as an admission that such publications are prior art for patentability determination purposes.

Hydrogen is used in various industrial processes and fuel cells. Most hydrogen is produced by high-temperature steam reforming of organic fuels. One example is the steam reforming of methanol, in which the methanol and water are reacted at 200-300° C. over a reforming catalyst:

This steam reforming reaction is a two-step process, the first of which is methanol decomposition:

Full completion of the reforming reaction then proceeds via the water-gas-shift (WGS) reaction:

However, if the steam reforming hydrogen generator is paired with a fuel cell, then product water from the fuel cell can be recovered, blended into the reactor feed, and used in the reforming reaction. In this case, neat methanol can be used as the stored fuel, which maximizes the fuel energy density.

Another benefit of neat methanol is that it can be used in a burner to supply the heat for the endothermic reforming reaction. Typically, the amount of fuel diverted to the burner is minimized and system efficiency is maximized by the extensive use of heat exchangers to vaporize the reactants and recuperate heat. Such strategies are typically employed for transportation or stationary applications of considerable power levels. On the other hand, the extensive subsystems required to manage the water and heat greatly complicate the system, further compounding operational difficulties as well as cost and reliability.

Amongst such difficulties is the appreciable byproduct CO formed by the steam reforming reaction, which is a poison to low-temperature fuel cell systems. The CO level can be lowered to ppm levels using high steam-to-methanol ratios and additional WGS and preferential oxidation reactors, resulting in an even yet more complicated system. Alternatively, the hydrogen can be separated from the reformate using a permselective membrane such as palladium. The hydrogen permeate is then delivered to the end-use (for example, a fuel cell). The retentate, which consists primarily of $CO_2$, as well as lesser amounts of CO, remnant $H_2$, and excess reaction water, has a low heat value but can be used to augment the burner fuel. The reformer and separator may optionally be combined to make a "membrane reactor," which has certain advantages under some situations. The general approach of combining fuel reforming and hydrogen separations is well known in the art. See, for example, U.S. Pat. Nos. 5,997,594 and 6,221,117.

Because of the high efficiencies that can be attained, albeit with complicated systems, steam reforming is the preferred large-scale source of hydrogen (e.g., for industrial and stationary applications). However, steam reforming is difficult to implement in small systems. Scaling down the highly integrated and complicated systems discussed above is difficult and expensive. Particularly, heat losses become much more pronounced. As device sizes decrease, the surface area per unit volume of the device increases. As such, a device measuring one-tenth as large as an otherwise equivalent version will have a tenfold greater heat loss (surface area) per unit capacity (volume) than the larger device. Thus, additional challenges and difficulties are encountered in developing small-scale thermal process systems.

Because of the heat loss difficulties with small systems, the enthalpies of the liquid forms of the reactants are used in the equations and calculations. Otherwise, using the vapor enthalpies, as is usual in the literature, assumes that there are no difficulties in recovering the waste heat necessary to vaporize the reactants, which is not the case in small systems.

An initial effort to simplify a portable reforming system is to eliminate the need for water recovery by using a methanol and water mixture for the fuel, instead of neat methanol. Typically, a 1:1 molar ratio (64 wt % methanol) is used per the stoichiometry of Equation 1, even though conversion is not optimal with the low steam content. The effective hydrogen density of the stored fuel is also lower and it does not burn easily in the heater, but the water management is greatly simplified. A possibly greater difficulty is the heat management, as discussed above. To some extent it is possible to compensate for the heat losses or maximize recovery from the scant heat sources available, but the system either becomes too inefficient or too complicated to be attractive for portable applications. A discussion of some of the challenges faced with portable reforming systems and a review of recent efforts is provided by Holladay ("Review of Developments in Portable Hydrogen Production Using Microreactor Technology," J. D. Holladay, Y. Wang, and E. Jones, *Chem. Rev.*, 104 4767-4790 (2004)). In short, for portable systems, a hydrogen generator is needed that requires few components and that uses a simple reaction process that also provides a source of ample heat.

Another approach to producing hydrogen from methanol is to forego the WGS reaction and use only the first step of the reforming process, that is, methanol decomposition (Equation 2). This process produces CO instead of $CO_2$ as the primary by product. However, known decomposition systems suffer from many disadvantages, including for example the higher amount of heat required to liberate hydrogen and less hydrogen produced per mole of methanol (and thus lower efficiency) relative to steam reforming, and difficulties with a high CO concentration that impedes hydrogen permeation through permselective membranes. For example, the paper "Hydrogen generation in a Pd membrane fuel processor: assessment of methanol-based reaction systems," M. P. Harold, B. Nair, G. Kolios, *Chemical Engineering Science*, 58 2551-2571 (2003), incorporated herein by reference, concludes that a methanol decomposition/membrane separation system is "infeasible". Further, known methanol decomposition systems do not take advantage of the high heat value of the CO produced in the hydrogen generation reaction.

SUMMARY OF THE INVENTION (DISCLOSURE OF THE INVENTION)

The present invention is a method for producing hydrogen, the method comprising the steps of providing a fuel comprising an endothermically decomposable compound, decomposing the compound via a catalyst to form hydrogen and a primary by product having a heat value, separating the hydrogen, and reacting or burning the primary by product to produce sufficient heat to drive the decomposing step. The endothermically decomposable compound preferably comprises methanol. The fuel preferably comprises from zero to approximately 25 wt % water and from approximately 75 wt % to 100 wt % methanol, and more preferably comprises from zero to approximately 10 wt % water and from approximately 90 wt % to 100 wt % methanol, and most preferably comprises approximately 5 wt % water and approximately 95 wt % methanol. The water preferably cleans a permselective membrane used for the separating step. The catalyst is preferably selective for methanol decomposition over a reaction selected from the group consisting of a water-gas-shift reaction, formation of methane, formation of methyl formate, and formation of dimethyl ether. The primary byproduct preferably comprises carbon monoxide.

The reacting step preferably comprises oxidizing the primary byproduct using air. The method preferably further comprises the step of mixing the air with the primary byproduct using a venturi ejector. The providing step preferably comprises pressurizing the fuel. The reacting step preferably further comprises providing heat to a permselective membrane. The method preferably further comprises the step of regulating the pressure of the separated hydrogen, and preferably further comprises the step of modifying the fuel flow rate, thereby maintaining a desired temperature. The method preferably further comprises the step of regulating the pressure at which the decomposing step occurs.

The present invention is also a device for producing hydrogen, the device comprising a fuel comprising an endothermically decomposable compound, a reactor comprising a catalyst, the catalyst being selective for decomposing the compound to form hydrogen and a primary byproduct having a heat value, a permselective membrane for separating the hydrogen, and a burner for reacting or burning the primary byproduct, the burner producing sufficient heat to drive decomposition of the compound. The endothermically decomposable compound preferably comprises methanol. The fuel preferably comprises up to approximately 25 wt % water. The fuel more preferably comprises up to approximately 10 wt % water, and most preferably comprises approximately 5 wt % water and approximately 95 wt % methanol. The water preferably cleans the permselective membrane. The catalyst preferably is selective for methanol decomposition over a reaction selected from the group consisting of a water-gas-shift reaction, formation of methane, formation of methyl formate, and formation of dimethyl ether. The primary byproduct preferably comprises carbon monoxide. The device preferably further comprises a variable pressure and/or variable flow rate fuel source. The device preferably further comprises a pressure regulator for regulating the pressure of the separated hydrogen. The device preferably further comprises a pressure regulator for regulating the reactor pressure. The reactor and the membrane are preferably thermally integrated with the burner. The device preferably further comprises a venturi ejector for drawing air into the burner together with the primary byproduct.

The present invention is also an electric power source that comprises a fuel cell and the device described above.

An object of the present invention is to provide a hydrogen generator and/or fuel processor that is sufficiently simple and robust for practical application in small systems.

Another object of the present invention is to minimize the number of components and devices required for hydrogen generation.

An advantage of the present invention is that the heat source is preferably sufficiently abundant to overcome heat losses in smaller devices, thereby preferably eliminating the need for heat recovery devices.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

The present invention relates to a hydrogen generator that preferably comprises a reactor feed pump, a reactor feed that preferably comprises approximately 75-100 wt % methanol and 0-25 wt % water, a decomposition reactor preferably comprising a methanol decomposition selective catalyst, a hydrogen permselective separator to split the methanol decomposition products into permeate (hydrogen) and retentate (primarily CO), and a heater that burns the retentate using oxygen (air) to provide heat for the reactor and the permselective separator.

Although methanol is a preferred fuel, any endothermically decomposable compound may be used, including but not limited to carbohydrazide. It is preferable that the fuel used is relatively easy to decompose, decomposes endothermically to one or more byproducts which have high heat value, and produces little coking or other contamination of the permselective membrane.

A permselective separator is preferably used to avoid contamination issues by providing a pure hydrogen product. But to avoid or mitigate the water management, heat source, and start-up issues, the present invention preferably employs methanol decomposition instead of reforming.

Like reforming, the decomposition of methanol (Equation 2) is typically performed at 200-300° C. over a catalyst and is also an endothermic reaction, which requires 64 kJ to liberate each mole of $H_2$. In comparison, steam reforming (Equation 1) requires only 44 kJ to produce a mole of $H_2$. The important difference, though, is that the primary steam reforming byproduct ($CO_2$) has no fuel heat value, whereas the primary methanol decomposition byproduct (CO) is a substantial heat source when oxidized in a burner:

$$CO + 1/2\ O_2 \longrightarrow CO_2 \quad \Delta H_{rxn} \quad (4)$$
$$-111 \quad\quad 0 \quad\quad\quad -393 \quad -282\ kJ/mole$$

Thus, exothermic oxidation of the CO byproduct of methanol decomposition theoretically provides more than twice the heat required to drive the endothermic methanol decomposition reaction. In other words, the heat generation and exchange process needs to be only 50% efficient, which, while low, is not trivial for a small system. This excess heat advantage, and the fact that no water is needed to decompose methanol, helps to mitigate the fact that only two moles of hydrogen are produced per mole of methanol in this process compared to the three in steam reforming. In order to recover this heat source, as well as provide a pure hydrogen product, the CO and hydrogen products of the methanol decomposition need to be separated, with the CO-rich retentate sent to the burner and the hydrogen to the end-use application.

As mentioned above for an actual decomposition system, heat losses and inefficiencies will consume some of the extra heat available. If the hydrogen generator system is fairly large and efficient, the reactor feed fuel preferably contains some water to reform some of the methanol (thereby producing more $CO_2$ and less CO) and bring the heat value of the retentate down so that the system does not overheat. On the other hand, in small systems, such as portable fuel cell systems for electronics, heat losses are proportionally greater, in which case nearly pure methanol may be necessary to provide sufficient fuel content to the burner. Similarly, the water content of the fuel can be chosen to reflect the anticipated environmental conditions of the system. For example, a fuel for use in equatorial regions may contain more water than a fuel to be used in cold regions. Thus the water content of the fuel for the hydrogen generator is preferably chosen to optimize performance with respect to the heat losses of the system.

In the ideal case (no heat losses, complete hydrogen separation) where the endothermic decomposition and reforming reactions exactly balance the exothermic CO oxidation in the burner, the calculated optimal fuel composition is approximately 75 wt % methanol/25 wt % water. While heat losses are neglected, so too is the heat content of the hydrogen in the retentate (because complete separation is not physically possible), so this composition is a reasonable estimate of the upper bound on the water content, since for higher water concentrations insufficient CO will be produced to provide the heat to drive the endothermic reactions).

Unlike typical fuel mixtures, the present invention preferably utilizes fuel mixtures that, when fully reacted to produce hydrogen, produce a primary byproduct having a non-zero heat value. For example, at full conversion, the decomposition of neat methanol produces hydrogen; the primary byproduct CO has a heat value of 282 kJ/mole. In the case of methanol and water fuel mixtures, the WGS reaction will produce $CO_2$, and the theoretically calculated fuel composition where the yields of the CO and $CO_2$ reactant byproducts are an exact 1:1 molar ratio is 78 wt % methanol/22 wt % water. Since thermodynamic equilibrium of the WGS reaction prevents even the best reforming catalysts from being 100% selective to reforming, even a 75 wt % methanol/water fuel mixture (for example) will probably yield a reaction product that contains more CO than $CO_2$ on a molar basis. Thus, the primary byproduct of this fuel composition (and those richer in methanol) will be a species (for example, CO) with significant heat value, unlike in conventional methanol reforming, where the primary byproduct ($CO_2$) has zero heat value.

Although it may be perceived that the decomposition fuel will produce less hydrogen than a methanol/water reforming fuel because the stoichiometric yield is only two instead of three moles of hydrogen per mole of methanol, the decomposition fuel is actually superior to the reforming fuel. First, the gravimetric hydrogen content of the neat methanol decomposition fuel is 12.5 weight percent. This theoretical hydrogen content of the fuel is greater than the 12% obtained with the 1:1 molar methanol/water reforming fuel. Second, while neither system will accomplish the theoretical yield, the decomposition system will not need to consume hydrogen to produce heat for the system, whereas the reforming system essentially needs to burn product hydrogen to supply heat, which becomes particularly inefficient if significant heat losses are unavoidable (e.g., in portable systems).

The present invention preferably uses a pressurized fuel feed system. Those skilled in the art will readily recognize that there are several pumps available which can be used and will produce desirable results, but a compact and efficient pump is preferably used. Alternatively, a pressurized canister can be used and will provide desirable results. The methanol may be expelled from the canister by a propellant separated from the methanol by a bladder. Optionally the propellant can be mixed with the methanol, in which case the propellant is preferably one such as carbon dioxide which is stable in the reactor to prevent contamination. Or a non-degradable propellant, for example propane, may also serve as a fuel for the burner.

The present invention also preferably uses a venturi ejector to draw air into the burner using the pressurized retentate as the motive gas. This scheme supplies a simple configuration and taps the potential energy of the pressurized retentate. On the other hand, if for example, the hydrogen generator is paired with a fuel cell system, there may be a compressed air source available that can directly provide for the burner combustion needs, and a venturi ejector is not necessary. As such, the pressurized retentate may possibly be tapped for another application or simply introduced directly to the burner.

Figure 1:
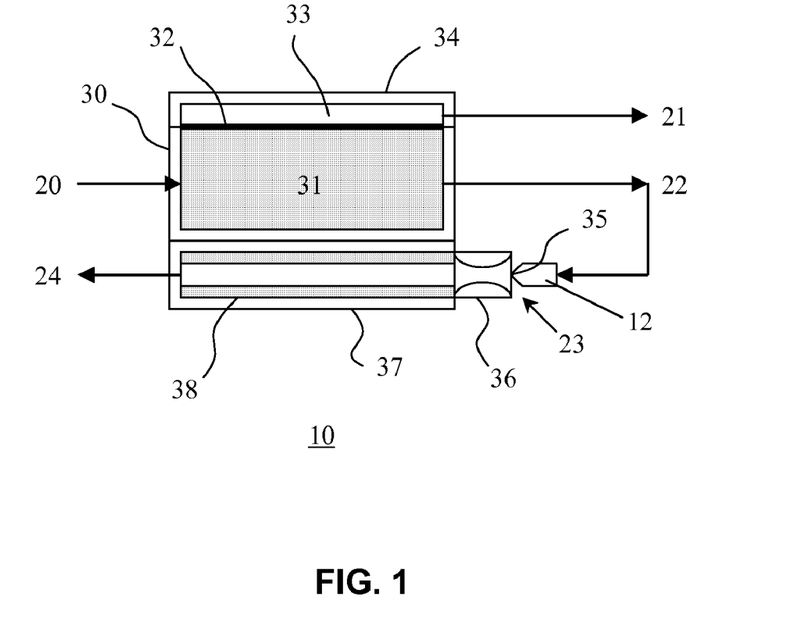
FIG. 1 is a schematic of an experimental version of an embodiment of the methanol decomposition hydrogen generator module of the present invention.

FIG. 1 shows an embodiment of the present invention combining the decomposition reactor, permselective membrane and burner described herein. It is preferable to house the components within the same module in order to facilitate heat transfer between the sources and sinks. Fuel 20 is preferably introduced at pressure into decomposition reactor 30, in which is preferably disposed methanol decomposition catalyst 31. Hydrogen produced by the decomposition reaction preferably permeates through hydrogen permselective membrane separator 32 into plenum 33, which is preferably disposed within separator housing 34. This permeate hydrogen, 21, is then preferably supplied to the end-use application. Products of the decomposition reaction that did not permeate through separator 32, primarily comprising carbon monoxide, non-permeate hydrogen, and unreacted fuel (as well as lesser byproducts) are collectively known as retentate 22. Retentate 22 is released from reactor 30 and preferably routed at pressure to an ejector, which preferably comprises orifice restrictor 35 disposed in nozzle 12 and preferably centrally aligned with ejector throat 36. The size of orifice restrictor 35 and retentate flow rate therethrough preferably effectively determines the pressure within reactor 30 and is correspondingly sized or controlled to achieve the desired pressure level. A high-speed jet of retentate 22 is preferably formed by orifice restrictor 35 and is directed through ejector throat 36 into burner 37, which is preferably thermally connected to reactor 30. Ejector throat 36 may comprise a venturi, a straight throat, or any other passage configuration. The suction drawn by ejector throat 36 preferably pulls ambient air 23 into burner 37 along with the retentate 22, which preferably is used as burner fuel. Depending upon conditions, retentate 22 and air 23 are burned directly in a flame and/or react on catalyst 38 preferably disposed within burner 37. The heat thus generated preferably drives the decomposition reaction on catalyst 31 in addition to preferably maintaining permselective separator 32 at a temperature sufficiently high to expedite the transport of hydrogen permeate across it. Thus, reactor 30, separator housing 34 and burner 37 are all preferably thermally integrated within module 10. Heat exchangers and other efficiency enhancement devices may optionally alternatively or additionally be implemented to maximize total performance of the system. Effluent 24 from burner 37 may optionally be discharged to a heat recovery device and/or a tail-gas clean-up bed to remove the last traces of unburned or unreacted gases.

Fuel 20 preferably passes through at least a portion of methanol decomposition catalyst 31 before it can access permselective separator 32, thereby generating sufficient hydrogen to drive permeation through separator 32 in the desired direction. Otherwise, in the entrance regions where fuel conversion and therefore hydrogen concentration is still low, the hydrogen at near atmospheric pressure in plenum 33 on the permeate side will back-diffuse to the retentate side, thus reducing the amount of permeate hydrogen 21. Thus in order to use the membrane as efficiently as possible, it is preferable that an appreciable hydrogen content is attained before the reactant stream hits the membrane.

Orifice restrictor 35 for ejector throat 36 preferably serves two purposes, first to draw air into the burner along with the retentate, and second, to restrict retentate flow in order to build up back-pressure in the decomposition reactor. The back-pressure of reactor 30 may optionally be partially or fully controlled by other means or devices known in the art, either alone or in tandem with orifice restrictor 35, in order to provide the optimal control of the system, though at the expense of greater complexity.

The ratio of orifice and ejector throat diameters, the fuel composition, the flow and/or pressure preferably determine the air-entrainment rate. Small catalytic heaters that use butane fuel driven ejectors to draw combustion air into the burners are known in the art and may be used with the present invention. In contrast, this invention preferably utilizes a reaction by-product to drive the ejector and fuel the burner instead of the stored butane fuel, and consequently the ejector design will typically be different. Most significantly, the air-entrainment ratios will likely need to be much lower than with butane systems in order to more closely attain stoichiometric burns and minimize the efficiency losses incurred in heating up unnecessary amounts of air. Thus, the ratios of the orifice and ejector throat diameters must be more carefully chosen for some embodiments of the present invention than with the butane systems. Despite the difficulties of achieving a well performing burner at small scales, the preferred use of a catalytic burner and an ejector induced air feed increases the overall simplicity of the system. With other air delivery approaches, such as an open or convective burner design, too much heat is typically lost and the heat transfer is poor. A pumped air system requires an additional component (i.e., the motor) that requires power and control. In the present invention, a venturi ejector is preferably utilized; the force to drive the air is provided by expansion of the high-pressure retentate, an energy source that would otherwise be difficult to tap and thus lost to the system.

Figure 2:
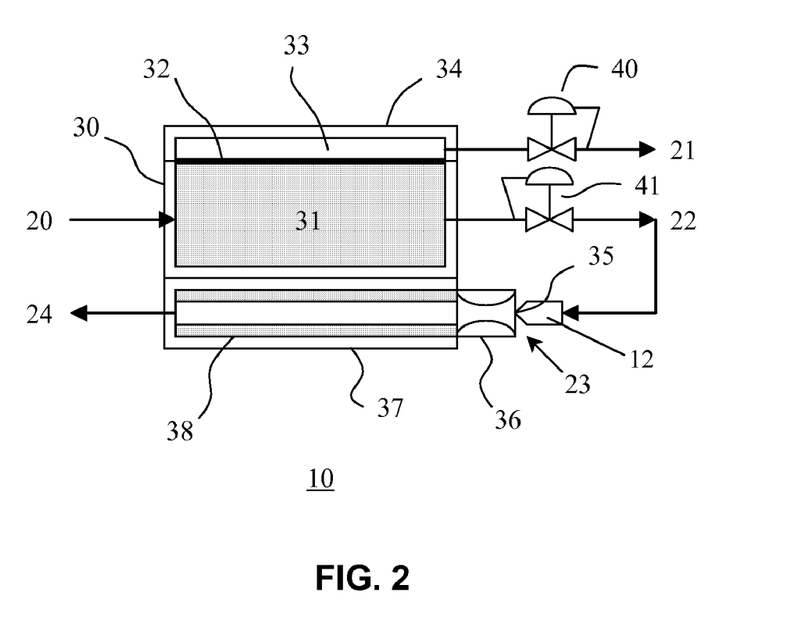
FIG. 2 shows locations of optional regulators on the permeate and retentate lines of FIG. 1.

Control of the hydrogen generator system of the present invention is preferably achieved by controlling the fuel flow rate to maintain the hydrogen generator module at a preferred temperature setpoint. In this approach, the module is preferably always at temperature and ready for full production. A schematic of a simple system for such control is shown in FIG. 2. If hydrogen is not being consumed, the hydrogen permeate pressure will build up until it matches the partial pressure of the hydrogen in the reactor. Hydrogen will no longer permeate through the membrane and will instead go to the burner along with the rest of the retentate. Less fuel is then required to keep the module at temperature, so the fuel flow rate is decreased accordingly. If the end-use cannot withstand high hydrogen pressures, then a standard downstream pressure regulator 40 can be located on the line for permeate hydrogen 21 upstream of the end-use application. As hydrogen is then consumed by the end-use application and the pressure of permeate 21 drops, hydrogen will again cross the membrane. As less hydrogen goes to burner 37, the module temperature will drop and the controller would preferably then increase the flow rate of fuel 20, thus supplying the extra fuel needed for both hydrogen production and heat. More complicated control schemes (e.g. the temperature and pressure are controlled relative to demand) may alternatively be used, possibly resulting in higher overall efficiency, but the simple system described here requires only a controller sensing a thermocouple (or other temperature sensor) to control the flow rate of fuel 20, which can be readily accomplished electronically.

Also shown in FIG. 2 is back-pressure regulator 41 on the line for retentate 22 upstream of orifice 35. While the regulator may be used for constant pressure experimentation, it may optionally be useful for a practical hydrogen generator. For example, back-pressure regulator 41 may be set at a minimum allowable pressure that needs to be exceeded before retentate 22 can flow, thus preventing flow of retentate 22 until a high enough pressure is achieved across orifice 35 to draw sufficient air 23 into ejector 36 to ensure substantially complete combustion of retentate 22 as fuel for the burner. This feature may be advantageous during start-up or for standby operation. In addition, back pressure regulator 41 is preferably adjustable and is preferably varied depending upon the values of process variables such as temperature or flow rate at various points in the system. One or more alternative means for regulating temperatures and/or pressures, particularly in the cases of start-up and transients, may optionally be employed in addition to, or in place of, one or both of the regulators described above.

Figure 3:
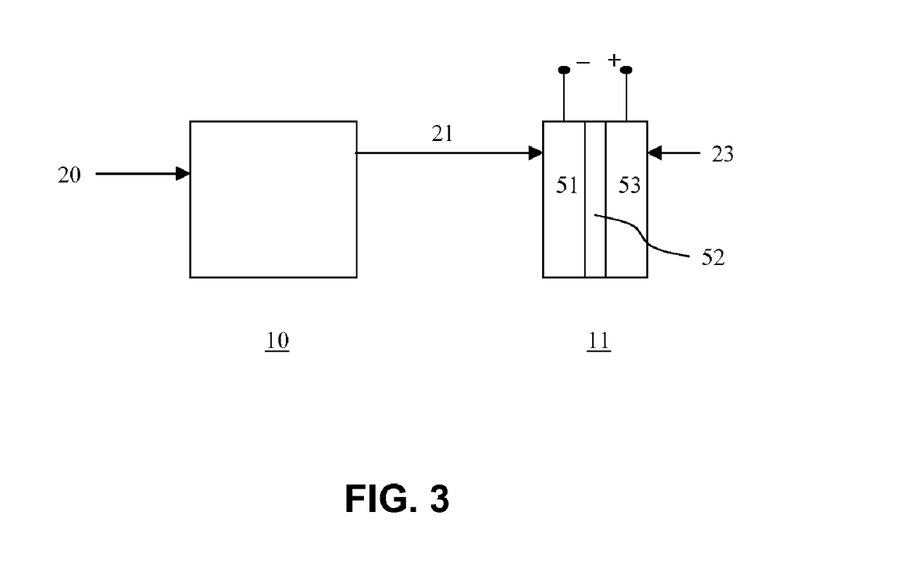
FIG. 3 depicts a methanol decomposition hydrogen generator module and fuel cell used to convert liquid fuel into electrical power.

A possible use for the methanol decomposition hydrogen generator of this invention would be in combination with a hydrogen fuel cell to provide a portable electric power source. In one possible embodiment as shown in FIG. 3, hydrogen generator module 10 is supplied with fuel 20 preferably consisting of approximately 75 wt %-100 wt % methanol and 0 wt % to approximately 25 wt % water. The substantially pure hydrogen permeate 21 product of hydrogen generator module 10 is preferably supplied to anode 51 of fuel cell 11. Electrolyte 52 preferably separates anode 51 and cathode 53. When air or other oxidizer 23 is supplied to cathode 53, a voltage is developed across fuel cell 11 and electrical power can be extracted. By the combination of hydrogen generator 10 and fuel cell 11, electrical power is generated from liquid fuel 20.

The present invention preferably provides the combination of an easily portable liquid fuel and a pure hydrogen product, the latter of which greatly simplifies and increases fuel cell options. For example, with pure hydrogen being provided to the fuel cell, low temperature fuel cells do not have fuel contamination issues (such as when CO is present in the hydrogen), the anode fuel supply can be greatly simplified without the presence of inerts (e.g. no purging or recirculation is required), and alkaline fuel cells can be used (since there is no $CO_2$ present in the hydrogen). While there are situations where a steam reforming membrane reactor is the preferred means to provide pure hydrogen, the advantages of system simplicity, high hydrogen yields, and use of a heat source able to overcome size-related losses of an embodiment of the present invention result in a liquid-fueled fuel cell system that is advantageous for portable systems.

Thus a simple embodiment of the methanol decomposition hydrogen generator of the present invention comprises a reactor/separator/burner module and a pressurized fuel source. The provision of extra heat allowed by separation of the byproducts possessing heat value permits the reduction or elimination of the need for heat exchangers and separate vaporizers, otherwise necessary to attain a positive heat balance and/or an efficient system. This simplicity, which makes it attractive for portable power applications, is preferably attained without sacrificing efficiency while providing hydrogen yields and other system capabilities that exceed that of current portable methanol reforming hydrogen generators. This is at least in part due to the advantages of (1) using a hydrogen generation reaction which produces byproducts having heat value, (2) separating the product hydrogen from the byproducts, which are used as burner fuel, and (3) combusting this fuel to drive the hydrogen generation reaction.

Membrane Fouling and Catalyst Selection

It is preferable to operate the present invention at approximately 300° C., although other temperatures may be employed. This temperature is effective in alleviating the poisoning effect of CO on catalysts in the short term; however, over time more stable CO species can form at catalytic surfaces to slowly poison the desired reactions. Also, it may be possible that the surface becomes slowly coked by the methanol decomposition. Elsewhere, it has been shown that the introduction of oxygen (as $O_2$) will cleanse a permselective membrane of methanol decomposition contaminants to maintain a stable hydrogen throughput [e.g., "Alcohol dehydrogenation over Pd versus PdAg membranes," H. Amandusson, L. G Ekedahl, H. Dannetun, *Applied Catalysis A*, 217, pp. 157-164 (2001)]. However, in this and other similar literature examples, reactor catalysts were not used in conjunction with the membranes. Presumably, any catalyst present would have catalyzed the consumption of oxygen and prevented it from reaching and cleansing the membrane.

Similarly, K. Hou and R. Hughes ("The effect of external mass transfer, competitive adsorption and coking on hydrogen permeation through thin Pd/Ag membranes," *J. Memb. Sci.*, 206 119-130 (2002)) determined that the hydrogen permeability of a Pd/Ag membrane could be maintained in the presence of methanol and hydrogen if water vapor was also introduced, presumably to clean the coked membrane. Again, a reactor catalyst was not used in this fundamental study.

In contrast to the above studies where reaction yield and conversion were not important factors, in the present invention, it is preferable for the hydrogen generator to have a reactor catalyst in conjunction with the membrane for the reasons illustrated above, i.e., maximum reaction conversion and maximum separation efficiency. In order to combine the ability of water in the fuel mixture to cleanse the permselective membrane (as discussed below) with the use of a reactor catalyst, it is necessary that an appreciable fraction of the water pass unreacted through the catalyst bed. Standard reforming catalysts would quickly consume the water. Thus, use of a reactor catalyst that is relatively inactive to the WGS reaction is preferable, so that water is not consumed. On the other hand, to maximize hydrogen production, the catalyst should be highly active for methanol decomposition. In other words, the catalyst is preferably highly selective for the decomposition reaction over the WGS reaction. This may alternatively be described as a high selectivity for decomposition over reforming, as reforming is essentially the combination of the decomposition and WGS reactions. Because the water is not consumed, it can be used at the permselective membrane to clean the CO and/or coke contaminants which build up on the membrane. It is preferable that the system parameters are chosen, and the system is operated, so that there is sufficient water to clean the membrane, but that most of the water in the fuel is used to clean the membrane and is therefore not included in the retentate (thus lowering the fuel value of the retentate). Also, the use of such a catalyst will preferably result in the formation of more CO than $CO_2$, thus increasing the fuel value of the retentate.

Of a variety of promoted and unpromoted Pd catalysts tested by Iwasa et al. [N. Iwasa, T. Mayanagi, W. Nomura, M. Arai, and N. Takezawa, *Applied Catalysis A*, 248 153-160 (2003)], unpromoted Pd on zirconia ($Pd/ZrO_2$) has a low selectivity for methanol reforming as well as the highest rate of hydrogen generation due to methanol decomposition (i.e., highly selective for decomposition over WGS). Another study comparing Pd catalysts on various oxide supports also shows that zirconia supports provide the highest methanol decomposition rates [Y. Usami, K. Kagawa, M. Kawazoe, Y.

Matsumura, H. Sakurai and M. Haruta. *Applied Catalysis A*, 171 123-130 (1998)]. Further, the oxide supported Pt or Pd catalysts are much more selective for hydrogen formation than the conventional Cu-Zn reforming catalysts, as the latter also produce a significant amount of by-products such as methane, methyl formate and dimethyl ether, in addition to $CO_2$ [J. C. Brown and E. Gulari, *Catalysis Communications*, 5 431-436 (2004)]. Lastly, of several Pd catalyzed oxide supports, the zirconia-based catalysts are selective for methanol in CO hydrogenation, whereas other oxides are selective for dimethyl ether or methane [W. J. Shen, M. Okumura, Matsumura, and M. Haruta. *Applied Catalysis A*, 213 225-232 (2001)]. Hence, zirconia is preferred to minimize unwanted side reactions and byproducts. Taking these factors together, of the catalysts studied in these references, $Pd/ZrO_2$ is preferred for the methanol decomposition catalyst of this invention in order to allow as much water access to the membrane as possible, as well as maximize the total hydrogen generation rate. However, other catalysts may prove to be equally or more effective. For example, Xu et al. claim that the selectivity of their leached $Ni_3Al$ catalyst is nearly complete for methanol decomposition over reforming with even a high water content of 1.5 moles of water per mole methanol [Y. Xu, S. Kameoka, K. Kishida, M. Demura, A. Tsai and T. Hirano, Intermetallics, 13 151-155 (2005)].

Thus attaining and maintaining high hydrogen permeation through a permselective membrane in the presence of a reactor catalyst is preferably achieved with the use of a small portion of water in the fuel combined with the use of a catalyst that is highly selective for decomposition over WGS, so as to maximize the amount of water that can access and cleanse the membrane.

INDUSTRIAL APPLICABILITY

The invention is further illustrated by the following non-limiting example.

An experimental module was constructed in accordance with FIG. 1 such that elements of the components could be changed to test various experimental permutations. A roughly 1.5 mm wide and 3 mm deep serpentine channel was machined into the face of a 5×5×1 cm copper reactor plate and provision was made for fluid connections to either end of the channel. The channel and inlet port was filled with approximately 1 cc of methanol decomposition catalyst. Clamped between the catalyst channel-side of the copper plate and a 3 mm thick stainless steel endplate was a 25 micron thick Pd foil sandwiched by 0.25 mm thick carbon papers for support and gas distribution. Sealing around the foil and to the plates was accomplished using 0.3 mm thick graphite gasket sheet. The effective hydrogen permeation area of the foil was 4 $cm^2$. A fitting in the endplate allowed gas collection from the plenum in the separator housing. Attached to the underside of the copper reactor plate was a second, or burner, plate, into which a series of manifolded parallel channels were machined. The channels distributed the fuel gas and air over a $Pd/TiO_2$ catalyst bed (titania support from Alfa Aesar dissolved in water and slurry cast and fired prior to Pd impregnation). The inlet manifold accommodated a venturi ejector with the nozzle provided by a precision micro-orifice terminated tube (from Lenox Laser). Auxiliary heating was provided by a cartridge heater inserted into the copper reactor plate.

For experimentation, the module was heated to the desired temperature using the cartridge heater powered through a temperature controller. The fuel mixture was provided by an HPLC pump, typically at 0.04 ml/min. A back-pressure regulator was used in lieu of (or in addition to) the ejector orifice for constant pressure experimentation. When operated in the configuration shown in FIG. 1 (i.e., no additional back-pressure regulator) and a 0.04 ml/min feed into module 10 at 300° C., a 17 micron (0.0007") diameter orifice results in a reactor pressure of about 10.3 atm (140 psig). The use of a larger 25 micron (0.001") diameter orifice generates about a 6.2 atm (80 psig) back-pressure. Measured flows were cooled to room temperature to condense out liquid components and the gas rates were measured using volumetric displacement meters and corrected to standard conditions accounting for ambient pressure and temperature.

Various permutations of decomposition catalyst, permselective membrane treatments, fuel compositions and module temperatures and reactor pressures were tested. The methanol decomposition conversion reaction yield was typically greatest at low pressures and decreased as the pressure was increased. However, the decrease is markedly less when the decomposition reactor is integrated with the permselective separator membrane than when the two processes are in series. This is a well-known advantage with "membrane reactors" where the removal of a reaction product (i.e., hydrogen) shifts reaction equilibrium further towards the products and hence increases overall conversion. Thus, it is desirable for reaction purposes as well as thermal integration and packaging to combine the decomposition reactor with the permselective membrane, as depicted in FIG. 1.

It was also discovered that approximately 300° C. is a desirable module operating temperature, as the decomposition and permeation rates both become sufficiently fast for decent conversions and hydrogen yields. At temperatures much below this level, strong CO adsorption on the surfaces impedes both processes.

Figure 4:
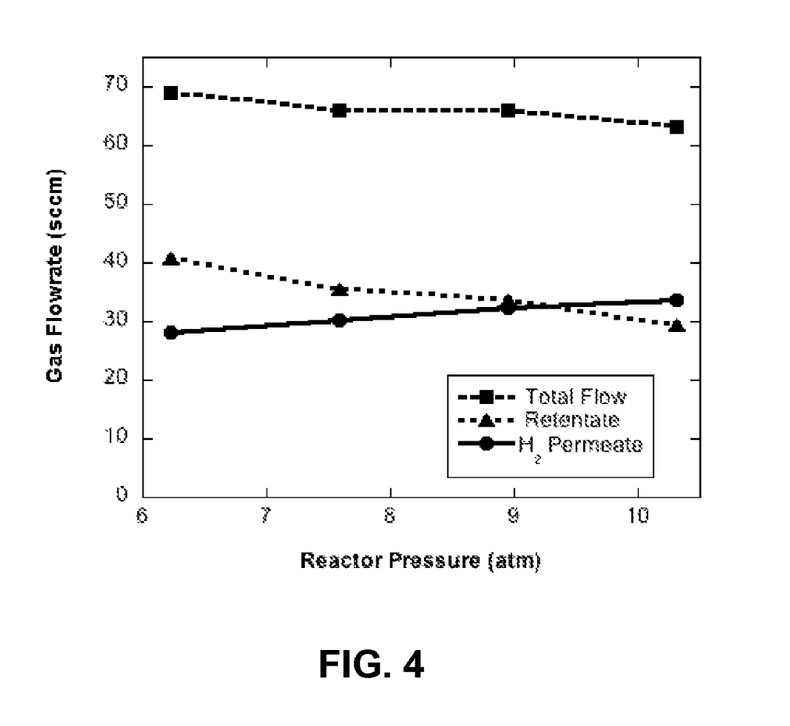
FIG. 4 shows product gas flows in an experimental hydrogen generator module operating at 300° C. as a function of reactor pressure for a Pd/zirconia decomposition catalyst and a 4 $cm^2$ Pd permselective membrane.

FIG. 4 shows experimental flow rates obtained with a preferred combination of components and conditions. Here, a 95 wt % methanol/water fuel was introduced at 0.04 ml/min to the module maintained at a temperature of 300° C. The decomposition catalyst was 1.25 g of a 6 wt % Pd on zirconia catalyst (a zirconia support from Alfa Aesar was crushed and sieved to approximately +100/−24 mesh before Pd deposition), which was found to provide the highest yields of the catalysts tested. The 4 $cm^2$ active area permselective separator membrane was a 25 micron thick Pd foil. In a standard experimental run, the back-pressure was set to a specific value, performance was allowed to stabilize and the gas flow rates were measured at that pressure. Then the pressure was set to a new value and the cycle repeated. In the figure, it is seen that the hydrogen permeate yield increased nearly linearly with pressure from 6 to 10 atm, even as the methanol decomposition conversion (total flow) decreased. Apparently, the increases in hydrogen partial pressure and permeation that occurred when total pressure was increased more than off-set the decrease in hydrogen yield with the lower conversion.

It was found that pressures of at least 6 atm are desirable, as below this level the permeation rates are relatively low even though conversions are somewhat higher. Conversely, higher operating pressures will increase membrane throughput, but will thermodynamically limit the methanol decomposition rate by driving the decomposition reaction backwards. This may be mitigated by introducing additional decomposition catalyst into the membrane plenum, thus enabling adequate hydrogen conversion at higher pressures. As hydrogen is removed from the reactor, the methanol decomposition equilibrium would then shift forward again.

FIG. 4 illustrates the favorable results that were attained with this embodiment of the present invention. The hydrogen permeate yield for the highest-pressure shown (10.3 atm or 140 psig) was about 73% of the theoretical maximum hydrogen yield, yet attained with a fairly modest membrane area. The equivalent power of the hydrogen produced with this module was 5.8 W. The specific energy of the recovered hydrogen content of the fuel was about 3 Wh/g and the energy density was approximately 2.4 Wh/cc. When these results are projected to a full system, further inefficiencies need to be considered, such as the power required to run auxiliaries (e.g., the fuel pump and control electronics). If the system efficiency is anticipated to be 80% and the hydrogen generator is combined with a 60% efficient fuel cell, the electrical energy content of the fuel is thus projected to be as high as 1.4 Wh/g or 1.1 Wh/cc with the hydrogen yields thus far demonstrated.

Figure 5:
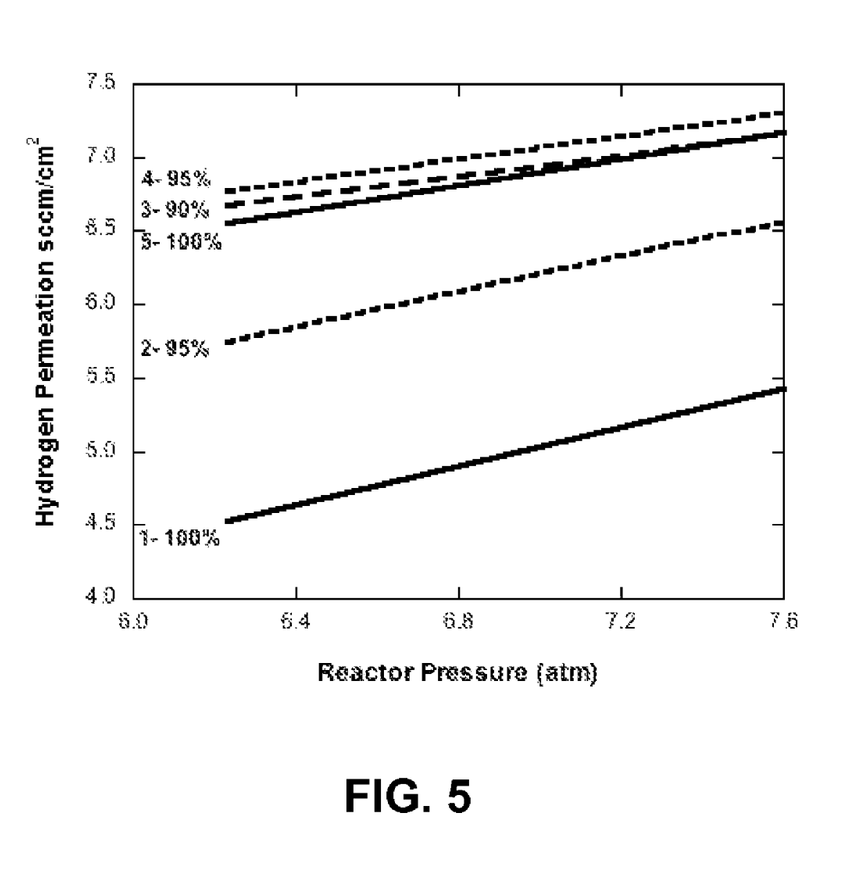
FIG. 5 shows the hydrogen permeation flux through the permselective membrane for a series of 300° C. experimental runs with differing fuel methanol concentrations (balance water), demonstrating the beneficial effects of water in recovering and maintaining hydrogen permeability.

A 95 wt % methanol/water fuel was used for the experimental results depicted in FIG. 4 to maintain maximum throughput of the hydrogen permeate. FIG. 5 illustrates the motivation for this fuel choice and the critical importance of introducing a small amount of water to the fuel feed. Initially, a reactor and membrane module with components similar (but not identical) to those used in FIG. 4 (e.g., Pd/zirconia catalyst, Pd membrane) was operated on neat (100%) methanol for a number of experimental runs. The hydrogen permeation data depicted in curve 1 of FIG. 5 was obtained using a 0.04 ml/min fuel feed rate and a reactor/membrane module temperature of 300° C. The feed was then switched to a 95 wt % methanol/water fuel, operated for several hours, and then curve 2 was derived. The cycles of several hours of operation followed by data collection were continued for the remaining curves depicted. It was apparent that throughput increased upon operating the module with water containing fuels, possibly due to the water cleansing the membrane and removing blocking contaminants. Partial cleansing is achieved by curve 2, and probably fully achieved by curve 3 (90% methanol). Curve 4 (95% methanol) demonstrates the highest performance, actually providing higher throughput than curve 3, but the difference is more likely due to the lower conversion and hydrogen partial pressure yielded with the higher water content fuel. Curve 5 shows the hydrogen permeation upon returning to neat methanol. By comparing the before and after performances of curves 1 and 5 it is shown that an appreciable increase in throughput was achieved by operating the module on water containing fuels to cleanse the membrane. Even then, the slight degradation in performance shown by curve 5 suggests that the throughput was already affected by the absence of water.

It should be noted that further performance improvements can be readily achieved with more advanced components. Particularly, the hydrogen permselective membrane used was a standard 25 micron (0.001") thick palladium foil. Various types of alloy membranes such as Pd/Ag or Pd/Cu are known and have been shown to provide higher throughputs and less tendency to hydrogen embrittle. There are many permselective separating materials known to those skilled in the art, and there is very extensive literature on the subject; see for example "Innovations in Palladium Membrane Research," S. N. Paglieri and J. D. Way, in *Separation and Purification Methods*, 31(1) 1-169 (2002), incorporated herein by reference. Of particular interest are the inexpensive composite membranes discussed in the paper, which use a low-cost but highly permeable metal foil (e.g. Ta, V, Nb) as the core and a thin layer of Pd or Pd alloy at the surface to protect the foil from oxidation as well as facilitate the hydrogen insertion and release. Another class of materials that provide hydrogen permselective separations is the mixed conductors, whereby a combination of both protonic and electronic conduction effectively permits hydrogen to shuttle through the structure.

The preceding example can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. A method for producing hydrogen, the method comprising the steps of:
   vaporizing a fuel comprising an endothermically decomposable compound and from zero to 25 wt % water;
   decomposing the compound via a catalyst in the presence of said water to form hydrogen and a primary byproduct having a heat value;
   separating the hydrogen from the primary byproduct; and
   oxidizing at least some of the primary byproduct of the decomposing step;
   wherein heat produced by the oxidizing step is used to vaporize the fuel and drive the decomposing step.

2. The method of claim 1 wherein the endothermically decomposable compound comprises methanol.

3. The method of claim 2 wherein the fuel comprises from 75 wt % to 100 wt % methanol.

4. The method of claim 3 wherein the fuel comprises from zero to approximately 10 wt % water and from approximately 90 wt % to 100 wt % methanol.

5. The method of claim 4 wherein the fuel comprises approximately 5 wt % water and approximately 95 wt % methanol.

6. The method of claim 1 wherein at least some of the water cleans a permselective membrane used for the separating step.

7. The method of claim 2 wherein the catalyst is selective for methanol decomposition over a reaction selected from the group consisting of a water-gas-shift reaction, formation of methane, formation of methyl formate, and formation of dimethyl ether.

8. The method of claim 1 wherein the oxidizing step comprises oxidizing the primary byproduct using air.

9. The method of claim 8 further comprising the step of mixing the air with the primary byproduct using a venturi ejector.

10. The method of claim 1 further comprising pressurizing the fuel.

11. The method of claim 1 wherein the oxidizing step further comprises providing heat to a permselective membrane.

12. The method of claim 1 further comprising the step of regulating a pressure of the separated hydrogen.

13. The method of claim 1 further comprising the step of modifying a fuel flow rate, thereby maintaining a desired temperature.

14. The method of claim 1 further comprising the step of regulating a pressure at which the decomposing step occurs.

15. The method of claim 1 wherein the primary byproduct comprises carbon monoxide.

* * * * *